(12) United States Patent
Liang et al.

(10) Patent No.: US 11,905,921 B2
(45) Date of Patent: Feb. 20, 2024

(54) MAIN BEAM FOR WIND TURBINE BLADE AND MANUFACTURING METHOD THEREOF

(71) Applicant: Envision Energy CO., LTD, Suzhou (CN)

(72) Inventors: Yuan Liang, Jiangsu (CN); Lars Overgaard, Aalborg (DK); Jianxu Sun, Jiangsu (CN); Lei Zhuang, Jiangsu (CN)

(73) Assignee: Envision Energy CO., LTD, Jiangsu (CN)

( * ) Notice: Subject to any disclaimer, the term of this patent is extended or adjusted under 35 U.S.C. 154(b) by 0 days.

(21) Appl. No.: 17/795,541

(22) PCT Filed: Feb. 18, 2020

(86) PCT No.: PCT/CN2020/075678
§ 371 (c)(1),
(2) Date: Jul. 27, 2022

(87) PCT Pub. No.: WO2021/163875
PCT Pub. Date: Aug. 26, 2021

(65) Prior Publication Data
US 2023/0074942 A1    Mar. 9, 2023

(51) Int. Cl.
*F03D 1/06*     (2006.01)
*B29C 70/52*    (2006.01)
*B29K 307/04*   (2006.01)
*B29K 309/08*   (2006.01)
*B29L 31/08*    (2006.01)

(52) U.S. Cl.
CPC ............ *F03D 1/0675* (2013.01); *B29C 70/52* (2013.01); *B29K 2307/04* (2013.01);
(Continued)

(58) Field of Classification Search
CPC .............. F03D 1/0675; B29D 99/0025; B29K 2307/04; B29K 2307/08
See application file for complete search history.

(56) References Cited

U.S. PATENT DOCUMENTS

| 8,905,718 B2 * | 12/2014 | Hayden | .............. | B29D 99/0003 416/224 |
| 2013/0340385 A1 * | 12/2013 | Hayden | .............. | B29D 99/0003 29/428 |

(Continued)

FOREIGN PATENT DOCUMENTS

| CN | 103817955 | 5/2014 |
| CN | 106401865 | 2/2017 |

(Continued)

OTHER PUBLICATIONS

"International Search Report (Form PCT/ISA/210) of PCT/CN2020/075678," dated Apr. 27, 2020, with English translation thereof, pp. 1-4.

(Continued)

*Primary Examiner* — Justin D Seabe
*Assistant Examiner* — John S Hunter, Jr.
(74) *Attorney, Agent, or Firm* — JCIPRNET

(57) ABSTRACT

A main beam for wind turbine blade, comprising: one or more carbon fiber pultruded bodies, wherein, each carbon fiber pultruded body comprising one or more carbon fiber pultruded sheets, the carbon fiber pultruded sheets are stacked along the thickness direction and are formed by curing a first infusion material, wherein a glass fiber infusion material is arranged between every two carbon fiber pultruded sheets; one or more inlays, which are arranged adjacent to the carbon fiber pultruded body in a direction perpendicular to the thickness direction of the main beam; one or more overlays, which cover the carbon fiber pultruded bodies and/or the inlays on both sides in the thickness (Continued)

direction of the main beam; and a second infusion material, which impregnates carbon fiber pultruded bodies, the inlays and the overlays.

13 Claims, 4 Drawing Sheets

(52) U.S. Cl.
CPC ..... *B29K 2309/08* (2013.01); *B29L 2031/085* (2013.01); *F05B 2230/30* (2013.01); *F05B 2280/6013* (2013.01)

(56) References Cited

U.S. PATENT DOCUMENTS

| | | | |
|---|---|---|---|
| 2014/0271217 A1* | 9/2014 | Baker | F03D 1/0633 416/226 |
| 2017/0082089 A1 | 3/2017 | Yarbrough et al. | |
| 2017/0306922 A1* | 10/2017 | Nakamura | B32B 27/36 |
| 2018/0058422 A1 | 3/2018 | Yarbrough et al. | |

FOREIGN PATENT DOCUMENTS

| | | |
|---|---|---|
| CN | 108284623 | 7/2018 |
| CN | 109094075 | 12/2018 |
| CN | 109098929 | 12/2018 |

OTHER PUBLICATIONS

"Office Action of Australia Counterpart Application", dated Oct. 24, 2023, p. 1-p. 4.

* cited by examiner

MAIN BEAM FOR WIND TURBINE BLADE AND MANUFACTURING METHOD THEREOF

CROSS-REFERENCE TO RELATED APPLICATION

This application is a 371 of international application of PCT application serial no. PCT/CN2020/075678, filed on Feb. 18, 2020. The entirety of the above mentioned patent application is hereby incorporated by reference herein and made a part of this specification.

TECHNICAL FIELD

The present invention generally relates to the field of wind turbine, in particular, to a main beam for wind turbine blade. Furthermore, the present invention relates to a method for manufacturing this main beam.

BACKGROUND

In recent years, as countries pay more attention to the environment, a rapid development trend is shown in the field of clean energy around the world. The clean energy, as a new type of energy, has the advantages of wide distribution, renewable energy and less environmental pollution compared with traditional fossil fuels. As the most potential representative of clean energy, the application of wind turbines is increasing and is expected to further replace traditional fossil energy.

The blades of the wind turbine are important components of the wind turbine to capture wind energy. The blades installed on the wind turbine hub are rotated by wind energy to generate lift, which is further converted into torque through the transmission chain in the nacelle to drive the generator to generate electricity. Under the same circumstances, the larger the impeller composed of blades, the more wind energy can be captured, so the blades of the wind turbine tend to be longer and longer.

As the blades get longer and longer, the headroom (the distance from the tip of the wind turbine blade to the tower, which is an important safety indicator) is becoming a bottleneck, and it is imperative to develop new blade materials or blade designs to improve the headroom. The blade main beam is the component that contributes about 90% of the swing stiffness, which basically determines the size of the headroom.

Carbon fiber is a high-modulus, high-strength material, but at the same time, it is expensive. Therefore, how to reasonably introduce carbon fibers into the blades to increase the headroom margin and minimize the cost of the blades is an important research topic for major wind power companies. Due to the high cost of the pure carbon fiber main beam and the long time to return the cost of one-time investment, a variety of hybrid carbon fiber materials emerge as the times require. Hybrid carbon fiber materials are formed by adding a certain amount of carbon fiber to traditional glass fiber materials. Hybrid carbon fiber materials may try to balance performance and cost.

However, the current hybrid carbon fiber materials mainly have the following limitations:

1. the mixing method of hybrid carbon fiber materials is mostly carried out at the material scale. For example, carbon fiber and glass fiber are mixed and woven in the same fabric layer in different proportions of fiber bundles, or a layer of carbon fiber and a layer of glass fiber are mixed. This mixing manner is extremely lack of design freedom, and the proportion of fiber mixing is completely controlled by the material supplier. For different types of blades, only fixed mixing ratio materials can be selected, which cannot meet the needs of customization for each model.

2. the final mechanical properties of carbon fiber are greatly affected by the process, so a stable process route is crucial to the performance stability of the final product. Carbon-glass hybrid materials (that is, a mixture of carbon fiber and glass fiber) generally use an infusion process, that is, multi-layered carbon-glass hybrid fabrics are superimposed and infused together, or several layers of carbon fiber and several layers of glass fiber cloth are superimposed and infused together. However, the infusion process of this material is prone to defects such as bubbles and wrinkles, which greatly compromise the final properties.

There is a need for a new wind turbine main beam or main beam material that at least partially eliminates the above limitations.

SUMMARY OF INVENTION

It is an object of the present invention to provide a main beam for wind turbine blade and a manufacturing method thereof, through the main beam and/or the method, various properties of the blade, such as stiffness, can be adjusted while reducing the amount of carbon fiber. At the same time, the drapability of the main beam to the curved mold is improved and defects such as bubbles and wrinkles are reduced, thereby improving the required stiffness and service life of the main beam.

In a first aspect of the present invention, this object is solved by a main beam for wind turbine blade, comprising:
  one or more carbon fiber pultruded bodies, each of the carbon fiber pultruded bodies comprising one or more carbon fiber pultruded sheets, the carbon fiber pultruded sheets are stacked along a thickness direction of carbon fiber pultruded bodies, wherein the carbon fiber pultruded sheets are formed by curing a first infusion material;
  one or more inlays, which are arranged adjacent to the carbon fiber pultruded bodies in a direction perpendicular to a thickness direction of the main beam;
  one or more overlays, which cover the carbon fiber pultruded bodies and/or the inlays on both sides in the thickness direction of the main beam; and
  a second infusion material, which impregnates the carbon fiber pultruded bodies, the inlays and the overlays.

In the context of the present invention, the term "main beam" refers to the elongated structure on both sides of the blade for reinforcing the blade. Usually, the main beams on both sides are connected with webs located inside the blade to support the inner space of the blade. The term "inlay" refers to a structure with a certain shape embedded in the main beam. The term "carbon fiber pultruded sheet" refers to a material made of carbon fiber impregnated with an infusion material, and the term "carbon fiber pultruded body" refers to a composite body composed of a plurality of carbon fiber pultruded sheets and the infusion material between them. Preferably, the inlay, the carbon fiber pultruded body in the main beam and the overlay form a continuous main beam surface, if necessary, having the desired curvature. The term "impregnate" refers to the infusing of an infusion material into an infusion object and at least partially bonding therewith and finally curing. In addition, the glass fiber infusion material between the carbon fiber pultruded sheets can be the second infusion material, that is, the infusing of the carbon fiber pultruded sheet and the infusing of the second infusion material can be performed in the same process, which can save the process. However, the glass fiber infusion material between the carbon fiber pultruded sheets may also be different from the second infusion material and be infused in a different process from the second infusion material. The carbon fiber pultruded sheets and inlays may be arranged adjacent to each other in a direction perpendicular to the thickness of the main beam, such as in the length and width directions of the main beam, to form the coverage area of the main beam. In the case where the carbon fiber pultruded sheets and the inlays are strip-like structures, the carbon fiber pultruded sheets and the inlays may be arranged adjacent to each other in the chord direction of the main beam. Here, the term "chord direction" refers to the direction perpendicular to the thickness of the main beam and perpendicular to the length of the blade.

In a preferred embodiment of the present invention, the one or more carbon fiber pultruded sheets comprise a plurality of carbon fiber pultruded sheets, and a glass fiber infusion material is provided between at least two of the plurality of carbon fiber pultruded sheets.

In an extended embodiment of the present invention, the carbon fiber pultruded bodies has m of the carbon fiber pultruded sheets, and the main beam has n of the carbon fiber pultruded bodies, p of the inlays, and q of the overlays, wherein m, n, p, q are integers from 1 to 100. For example, the one or more inlays may be placed on one or both sides of each of the carbon fiber pultruded bodies, respectively. Not only can the number of the inlays be adjusted, but also the stiffness and flexibility of the inlays can be adjusted to achieve the desired drapability after secondary infusion with the carbon fiber pultrude bodies to better form the desired curved surface.

In an extended embodiment of the present invention, the first infusion material comprises one or more of the following: thermosetting epoxy resin, vinyl resin, unsaturated polyester resin, phenolic resin, and thermoplastic resin. Other infusion material is also conceivable under the teachings of the present invention.

In an extended embodiment of the present invention, the thermoplastic resin comprises one or more of the following: polypropylene resin, polyethylene resin, polyvinyl chloride resin, polystyrene resin, acrylonitrile-butadiene-styrene copolymer resin, polyamide resin, polyetheretherketone resin, and polyphenylene sulfide resin. Other thermoplastic resin is also conceivable under the teachings of the present invention.

In an extended embodiment of the present invention, the overlay comprises glass fiber fabric or glass fiber non-woven fabric.

In an extended embodiment of the present invention, the inlay comprises one or more of the following: PVC foam, PET foam, PMI foam, wood, honeycomb sandwich material, glass fiber pultruded sheet, glass fiber fabric, glass fiber non-woven fabric, and glass fiber yarn. Other inlay materials are also conceivable under the teachings of the present invention.

In an extended embodiment of the present invention, the second infusion material comprises one or more of the following: thermosetting epoxy resin, vinyl resin, unsaturated polyester resin, phenolic resin, and thermoplastic resin.

In an extended embodiment of the present invention, the thermoplastic resin comprises one or more of the following: polypropylene resin, polyethylene resin, polyvinyl chloride resin, polystyrene resin, acrylonitrile-butadiene-styrene copolymer resin, polyamide resin, polyetheretherketone resin, and polyphenylene sulfide resin.

In a preferred embodiment of the present invention, the inlays comprise:
  a main body of the inlays, the thickness $d_1$ of which is less than or equal to the sum D of the thicknesses of the adjacent carbon fiber pultruded bodies and the overlays; and
  a transition portion of the inlays, the thickness $d_2$ of which varies between zero and $D-d_1$, wherein the transition portion of the inlays is arranged between the main body of the inlay and the adjacent carbon fiber pultruded bodies to form a thickness transition.

Through this preferred embodiment, better drapability of the main beam can be achieved. The reason is that, firstly, when there is a transition portion on the upper part of the inlays, the overlays only need to cover the carbon fiber pultruded bodies, thereby providing more mobility in the thickness direction of the main beam; secondly, since the inlays are composed of the main body and the transition portion in the thickness direction of the main beam, more mobility is provided in the direction perpendicular to the thickness direction of the main beam, such as the chord direction; the mobility facilitates the formation of the desired surface shape, such as a curved surface, of the main beam material prior to infusing, and thus the surface shape can be cured and maintained after infusing.

In an extended embodiment of the present invention, the cross-section of the main body of the inlays is rectangular and the cross-section of the transition portion of the inlays is triangular. According to different applications, different shapes of the main body of the inlays and the transition portion of the inlays can be adopted. For example, the shape of the main body of the inlays and the transition portion of the inlays may be determined according to the desired final shape of the main beam.

In a second aspect of the present invention, the foregoing object is solved by a method for manufacturing the main beam for wind turbine blade, the method comprises the following steps:
  providing one or more carbon fiber pultruded bodies, each of the carbon fiber pultruded bodies comprising one or more carbon fiber pultruded sheets, the carbon fiber pultruded sheets are stacked along a thickness direction, wherein the carbon fiber pultruded sheets are formed by curing a first infusion material, wherein a glass fiber infusion material is arranged between every two of the carbon fiber pultruded sheets;
  arranging one or more inlays adjacent to the carbon fiber pultruded bodies in the direction perpendicular to the thickness direction of the main beam;
  arranging one or more overlays on the carbon fiber pultruded bodies and/or the inlays on both sides in the thickness direction of the main beam; and
  impregnating the carbon fiber pultruded bodies, the inlays and the overlays with a second infusion material.

In a preferred embodiment of the present invention, arranging the one or more inlays adjacent to the carbon fiber pultruded bodies in the direction perpendicular to the thickness direction of the main beam comprises the following steps:
  disposing a main body of the inlays adjacent to the fiber pultruded bodies, wherein the thickness $d_1$ of the main body of the inlays is less than or equal to the sum D of the thicknesses of the adjacent carbon fiber pultruded bodies and the overlays; and arranging a transition portion of the inlays between the main body of the inlays and the adjacent carbon fiber pultruded bodies to form the transition portion of the inlay with a thickness transition, wherein the thickness d2 of the transition of the inlays varies between zero and D−d1.

Through this preferred embodiment, better drapability of the main beam can be achieved. The reason is that, firstly, when there is a transition on the upper part of the inlays, the overlays only need to cover the carbon fiber pultruded bodies, thereby providing more mobility in the thickness direction of the main beam; secondly, since the inlays are composed of the main body and the transition in the thickness direction of the main beam, more mobility is provided in the direction perpendicular to the thickness direction of the main beam, such as the chord direction; the mobility facilitates the formation of the desired surface shape, such as a curved surface, of the main beam material prior to infusing, and thus can cure to maintain the surface shape after infusing.

In an extended embodiment of the present invention, arranging the one or more inlays adjacent to the carbon fiber pultruded bodies in the direction perpendicular to the thickness direction of the main beam comprises the following steps:
  placing the inlays on both sides of each of the carbon fiber pultruded bodies to form a continuous composite.
  In an extended embodiment of the present invention, providing the one or more carbon fiber pultruded bodies comprises the following steps:
  arranging one or more carbon fiber pultruded sheets stacked with each other along the thickness direction, wherein the carbon fiber pultruded sheets have been impregnated and cured with the first infusion material; and
  setting a glass fiber infusion layer between every two of the carbon fiber pultruded sheets for secondary infusion.

The present invention has at least the following beneficial effects: (1) the invention better solves the problems of air bubbles and wrinkles in the carbon fiber mixed material through two infusions, that is, the infusion of the carbon fiber pultruded body and the infusion of the main beam. This is because in the present invention, only the carbon fiber pultruded body is formed by infusing multiple stacks, and the second infusion is mainly used for the secondary infusion of the infused carbon fiber pultruded body and the inlay. This process is less prone to bubbles and wrinkles, as significantly fewer layers are to be infused in this process compared to the prior art laminates in which carbon fiber sheets and glass fiber layers are arranged on top of each other. Since the carbon fiber pultruded body replaces most of the hybrid fiber stacks, the risk of defects such as air bubbles and wrinkles in the main beam is greatly reduced. (2) In the present invention, by laying the carbon fiber pultruded body and the inlay in contact with each other, the drapability of the main beam made is improved, so that it can better fit the mold and form a desired shape, such as a curved surface. (3) Since the material, rigidity, flexibility, shape and other parameters of the inlay can be easily adjusted, various physical and dimensional characteristics of the main beam, such as rigidity, thickness, width, etc., can be easily and accurately adjusted. (4) Carbon-glass mixing can be carried out at the scale of blade structure design, and is not restricted by material suppliers. The mixing ratio and form can be freely adjusted with different blade models. At the same time, carbon fiber adopts pultrusion process, and glass fiber can be in the form of glass fiber cloth. Through secondary infusion and curing together, it is ensured that the carbon fiber is used in the form of pultrusion, thereby improving the performance of the main beam.

BRIEF DESCRIPTION OF DRAWINGS

The present invention is further described below with reference to the accompanying drawings in conjunction with specific embodiments.

DESCRIPTION OF EMBODIMENTS

Figure 1A:
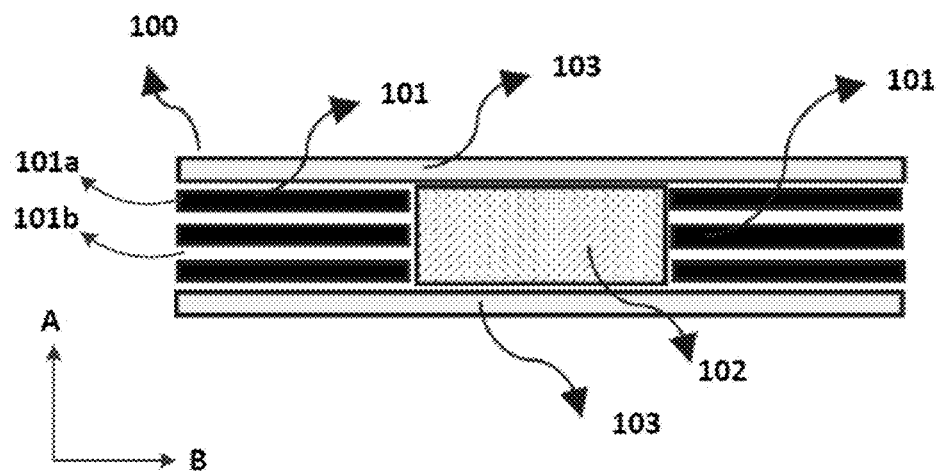
FIG. 1A-FIG. 1D shows various embodiments of the main beams according to the present invention.

It should be noted that various components in the various figures may be shown exaggerated for illustration purposes and not necessarily to correct scale. In the various figures, identical or functionally identical components are provided with the same reference numerals.

In the present invention, unless otherwise specified, "arranged on," "arranged over," and "arranged over" do not exclude the case where there is an intermediate between the two. In addition, "arranged on or above" only means the relative positional relationship between two components, and in certain circumstances, such as after reversing the product direction, it can also be converted to "arranged under or below", and vice versa.

In the present invention, each embodiment is only intended to illustrate the solution of the present invention, and should not be construed as limiting.

In the present invention, unless otherwise specified, the quantifiers "a" and "an" do not exclude the scenario of multiple elements.

It should also be pointed out here that, in the embodiments of the present invention, for the sake of clarity and simplicity, only a part of the components or assemblies may be shown, but those of ordinary skill in the art can understand that, under the teaching of the present invention, required parts or components may be added according to specific scenarios.

It should also be pointed out that within the scope of the present invention, the terms "same", "equal" and "equal to" do not mean that the two values are absolutely equal, but allow a certain reasonable error, that is, the phrases also encompass "substantially the same", "substantially equal", "substantially equal to". By analogy, in the present invention, the terms "perpendicular to", "parallel to" and the like in the table direction also encompass the meanings of "substantially perpendicular to" and "substantially parallel to".

In addition, the numbering of the steps of each method of the present invention does not limit the execution order of the method steps. Unless otherwise indicated, the various method steps may be performed in a different order.

The present invention is further described below with reference to the accompanying drawings in conjunction with specific embodiments.

FIG. 1A shows a first embodiment according to the present invention.

In the first embodiment, the main beam 100 has n carbon fiber pultruded bodies 101, p inlays 102 and q overlays 103, where n=2, p=1, and q=2. It should be noted that the numbers of n, p, q are only exemplary, and in other embodiments, different values of n, p, q may also be set.

Specifically, the main beam 100 comprises the following components:

A carbon fiber pultruded body 11, which has a plurality of carbon fiber pultruded sheets 101a and a second infusion material 101b, wherein the carbon fiber pultruded sheets 101a are arranged to overlap each other in the thickness direction A of the main beam 100 and are spaced apart by the second infusion material 101b. The second infusion material 101b is, for example, glass fiber fabric or non-woven fabric. In this embodiment, the glass fiber infusion material between the carbon fiber pultruded sheets 101a is the second infusion material 101b, that is to say, the infusion of the carbon fiber pultruded sheet 101a and the infusion of the second infusion material are the same process, which can save process. However, in other embodiments, the glass fiber infusion material between the carbon fiber pultruded sheets 101a may also be different from the second infusion material 101b, and be infused in a different process from the second infusion material. Here, the carbon fiber pultruded sheet 101a is, for example, formed by curing a certain amount of carbon fibers using a first infusion material (not shown). The first infusion material of the carbon fiber pultruded sheet 101b may comprise, for example, one or more of the following: thermosetting epoxy resin, vinyl resin, unsaturated polyester resin, phenolic resin, and thermoplastic resin. The thermoplastic resin may comprise, for example, one or more of the following: polypropylene resin, polyethylene resin, polyvinyl chloride resin, polystyrene resin, acrylonitrile-butadiene-styrene copolymer resin, polyamide resin, polyetheretherketone resin, and polyphenylene sulfide resin.

An inlay 102, which is arranged adjacent to the carbon fiber pultruded body 101 in a direction perpendicular to the thickness direction of the main beam 100, such as the chord direction B of the main beam 100. Here, the term "chord direction" refers to the direction perpendicular to the thickness of the main beam and perpendicular to the length of the blade. Here, the inlay 102 is arranged between and flush with the two carbon fiber pultruded bodies 12. In other embodiments, the inlay 102 may have a thickness difference with the carbon fiber pultruded body 12, and the thickness difference may be compensated for by the transition portion of the inlay or the overlay. The inlay 102 may comprise, for example, one or more of the following: PVC foam, PET foam, PMI foam, wood, honeycomb sandwich material, glass fiber pultruded sheet, glass fiber fabric, glass fiber non-woven fabric, and glass fiber yarn. Parameters of the inlay 102, such as material, rigidity, flexibility, shape, etc., can be adjusted according to the specific application, whereby various physical and dimensional characteristics of the main beam, such as rigidity, thickness, width, etc., can be easily and accurately adjusted.

An overlay 103, which covers the carbon fiber pultruded body and/or the inlay on both sides of the main beam 100 in the thickness direction A. The overlay 103 may comprise, for example, a glass fiber fabric or a glass fiber nonwoven fabric. The overlay 103 is used, for example, to form the surface of the wind turbine blade and to protect the inner material from the external environment damage. Here, two overlays 103 are shown, which cover both the carbon fiber pultruded body 101 and the inlay 102 on both sides of the main beam 100 in the thickness direction A, respectively. In other embodiments, the overlay 103 may only cover the carbon fiber pultruded body 101.

A second infusion material 101b, which impregnates the carbon fiber pultruded bodies, the inlays and the overlays. The second infusion material may comprise, for example, one or more of the following: thermosetting epoxy resin, vinyl resin, unsaturated polyester resin, phenolic resin, and thermoplastic resin. The thermoplastic resin may comprise, for example, one or more of the following: polypropylene resin, polyethylene resin, polyvinyl chloride resin, polystyrene resin, acrylonitrile-butadiene-styrene copolymer resin, polyamide resin, polyetheretherketone resin, and polyphenylene sulfide resin.

By selecting the materials and properties of the inlay 102, the drapability of the main beam 100 can be improved while maintaining the rigidity of the main beam 100, and defects, such as air bubbles and wrinkles, in the main beam 100 can be basically avoided. Therefore, the main beam 100 according to the present invention has a great technical improvement compared to the conventional main beam.

Figure 1B:
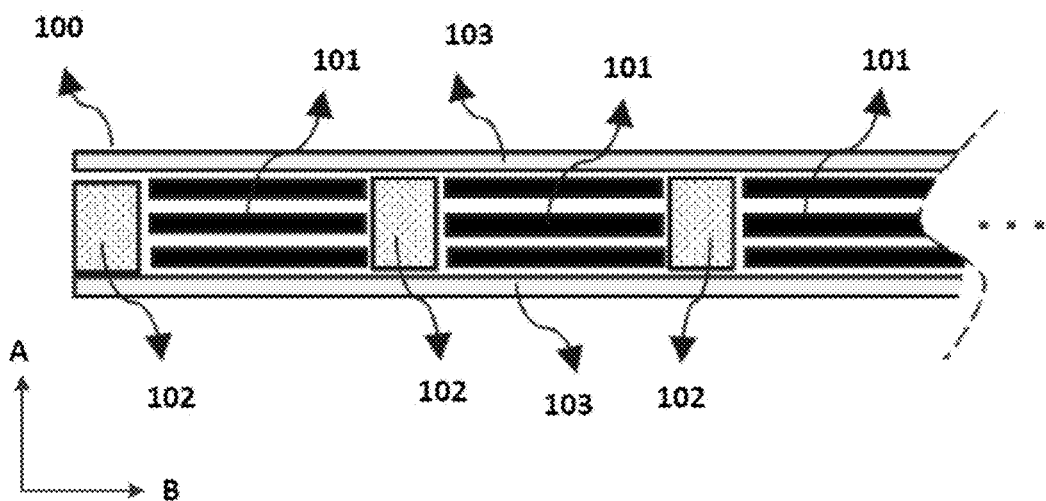

FIG. 1b shows a second embodiment according to the present invention.

In the second embodiment, the main beam 100 has n stacks of carbon fiber pultruded bodies 101, p inlays 102 and q overlays 103, where n=3, p=3, q=2. It should be noted that the numbers of n, p, q are only exemplary, and in other embodiments, different values of n, p, q may also be set.

In the second embodiment, a plurality of inlays 102 are arranged, and each inlay 102 has a smaller width than that in the first embodiment, thereby providing greater stiffness and better drapability. In other embodiments, smaller width inlays 102 may also be arranged, thereby providing greater stiffness and better drapability.

Figure 1C:
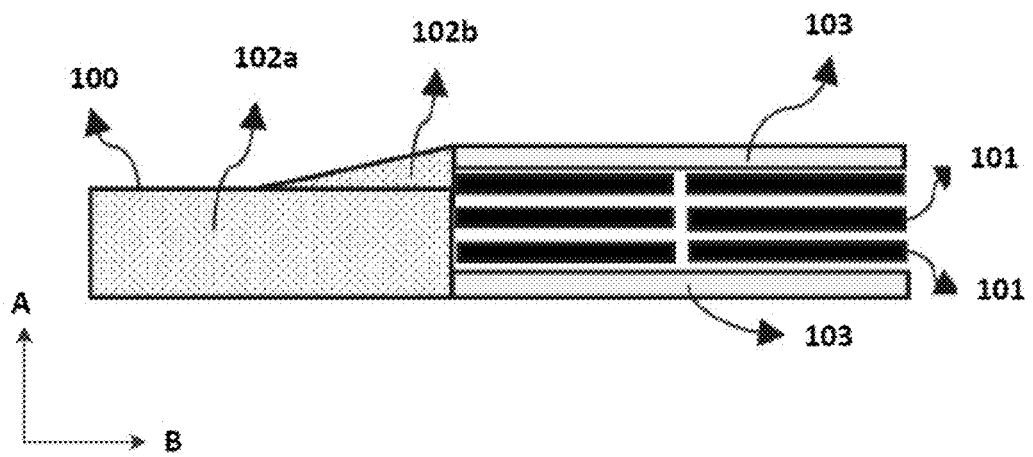

FIG. 1C shows a third embodiment according to the present invention.

In the third embodiment, the inlay 102 comprises:

A main body of the inlay 102a, the thickness d1 of which is smaller than the sum D of the thicknesses of the adjacent carbon fiber pultruded body 101 and the over 102. The cross section of main body of the inlay 102a may be rectangular, for example.

A transition portion of the inlay 102b, the thickness d2 of which varies between zero and D−d1, where the transition portion of the inlay 102b is arranged between the main body of the inlay and the adjacent carbon fiber pultruded body to form a thickness transition. The cross section of the transition portion of the inlay 102b is, for example, triangular.

By arranging the main body of the inlay 102a and the transition portion of the inlay 102b, a better drapability of the main beam can be achieved. This is because, first of all, in the case where there is an transition portion of the inlay 102b on the upper part of the inlay 102, the overlay 103 only needs to cover the carbon fiber pultruded body 101, thereby providing more mobility in the thickness direction A of the main beam 100; next, since the inlay 102 is composed of a plurality of parts of the main body of the inlay 102a and the transition portion of the inlay 102b in the thickness direction of the main beam 100, more mobility is provided in the direction perpendicular to the thickness direction of the main beam, such as the chord direction B of the main beam 100; these mobilities facilitate the formation of the desired surface shape, such as a curved surface, of the main beam material prior to infusion, so that curing after infusion maintains the surface shape.

Figure 1D:
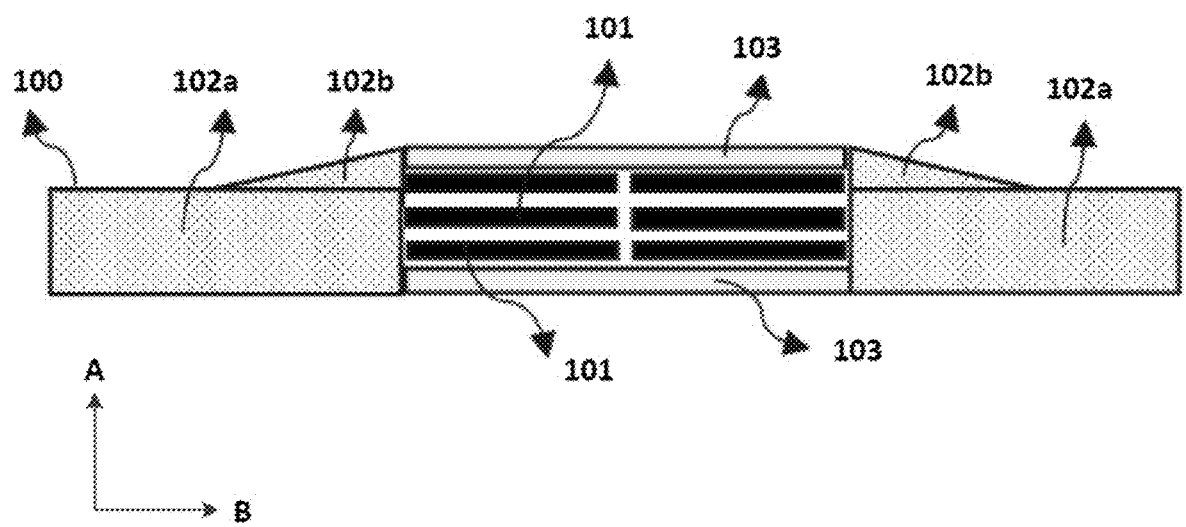

FIG. 1D shows a fourth embodiment according to the present invention.

The difference between the fourth embodiment and the third embodiment is that main body of the inlay 102a and transition portion of the inlay 102b are arranged on both sides of the carbon fiber pultruded body 101 to form a symmetrical shape transition. This symmetrical shape transition is favorable for forming a thickened portion of the material of the main beam, and the thickening portion is favorable for forming a special curved surface of the main beam or compensating for weak parts of the material.

Figure 2:
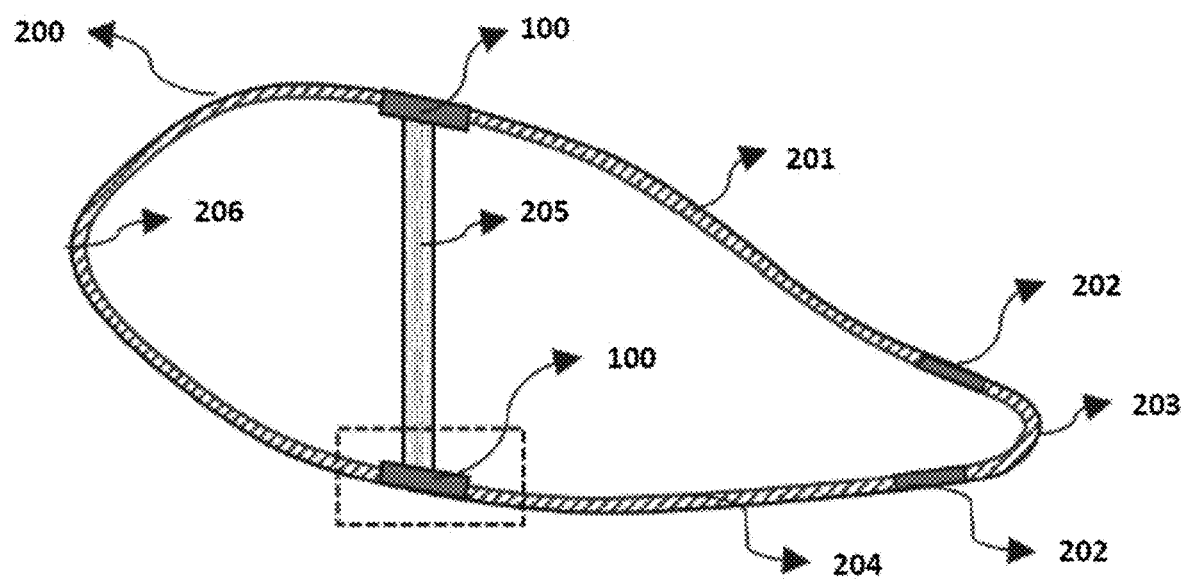
FIG. 2 shows a schematic diagram of a wind turbine employing the main beam according to the present invention.

FIG. 2 shows a schematic diagram of a wind turbine blade 200 employing the main beam 100 according to the present invention.

As shown in FIG. 2, the blade 200 has a leading edge 206 and a trailing edge 203. The part of the blade 200 between the leading edge 206 and the trailing edge 203 is divided into a windward side 201 and a leeward side 204. A trailing edge beam 202 is positioned near the trailing edge 203 to increase trailing edge strength. The main beam 100 is arranged on the windward side 201 and the leeward side 204, respectively, between the leading edge 206 of the blade and the trailing edge 203 of the blade. The main beams 100 are connected by webs 205 to increase the stability of the blade and prevent inward collapse. With the main beam 100 of the present invention, the rigidity of the blade 200 can be improved, and the drapability of the material of the main beam can be enhanced, thereby improving the aerodynamic performance and service life of the blade.

Figure 3:
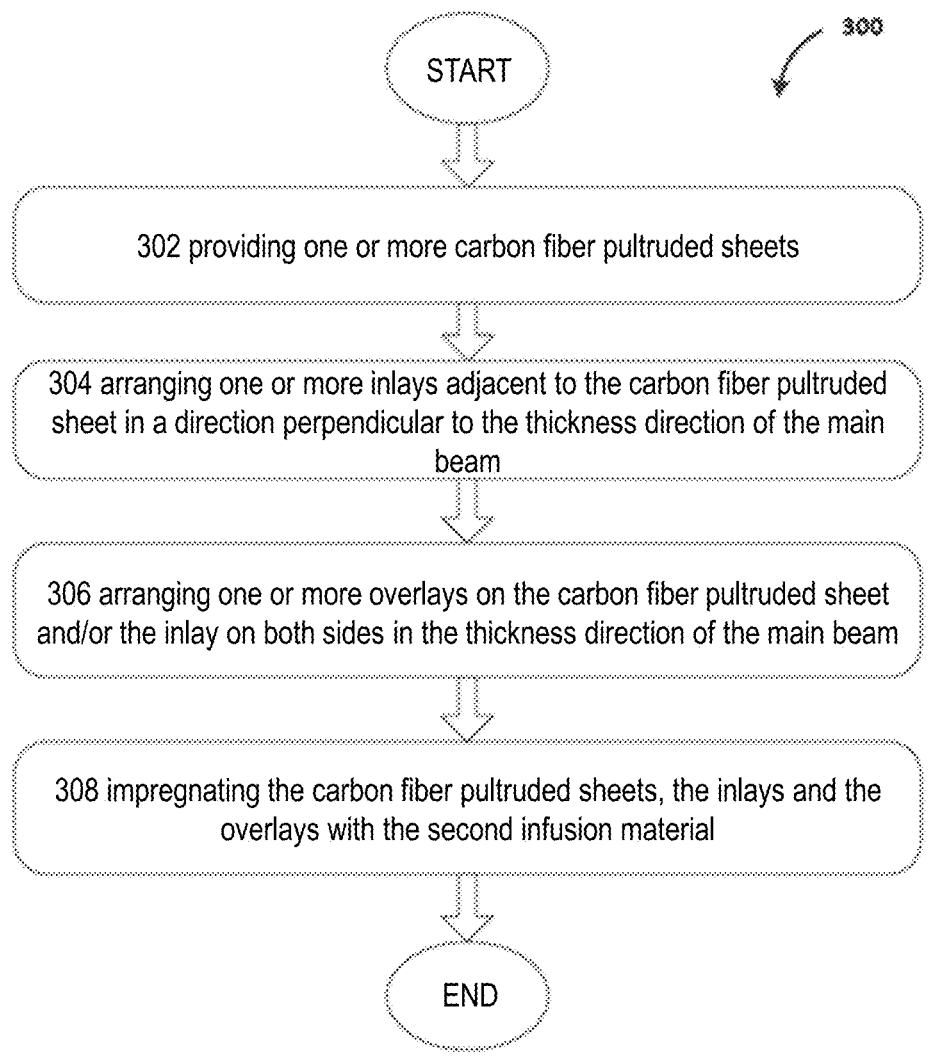
FIG. 3 shows a process flow of a method for manufacturing the main beam for wind turbine blade according to the present invention.

FIG. 3 shows a process flow of a method 300 for manufacturing the main beam for wind turbine blade according to the present invention.

At step 302, providing one or more carbon fiber pultruded bodies, each carbon fiber pultruded body comprising multiple carbon fiber pultruded sheets, the carbon fiber pultruded sheets are stacked in the thickness direction, wherein the carbon fiber pultruded sheets are formed by curing a first infusion material, wherein a glass fiber infusion material is arranged between every two carbon fiber pultruded sheets;

At step 304, arranging one or more inlays adjacent to the carbon fiber pultruded body in a direction perpendicular to the thickness direction of the main beam;

At step 306, arranging one or more overlays on the carbon fiber pultruded body and/or the inlay on both sides in the thickness direction of the main beam; and At step 308, impregnating the carbon fiber pultruded bodies, the inlays and the overlays with the second infusion material.

The present invention has at least the following beneficial effects: (1) the invention better solves the problems of air bubbles and wrinkles in the carbon fiber mixed material through two infusions, that is, the infusion of the carbon fiber pultruded body and the infusion of the main beam. This is because in the present invention, only the carbon fiber pultruded body is formed by infusing multiple stacks, and the second infusion is mainly used for the secondary infusion of the infused carbon fiber pultruded body and the inlay. This process is less prone to bubbles and wrinkles, as significantly fewer layers are to be infused in this process compared to the prior art laminates in which carbon fiber sheets and glass fiber layers are arranged on top of each other. Since the carbon fiber pultruded body replaces most of the hybrid fiber stacks, the risk of defects such as air bubbles and wrinkles in the main beam is greatly reduced. (2) In the present invention, by laying the carbon fiber pultruded body and the inlay in contact with each other, the drapability of the main beam made is improved, so that it can better fit the mold and form a desired shape, such as a curved surface. (3) Since the material, rigidity, flexibility, shape and other parameters of the inlay can be easily adjusted, various physical and dimensional characteristics of the main beam, such as rigidity, thickness, width, etc., can be easily and accurately adjusted. (4) Carbon-glass mixing can be carried out at the scale of blade structure design, and is not restricted by material suppliers. The mixing ratio and form can be freely adjusted with different blade models. At the same time, carbon fiber adopts pultrusion process, and glass fiber can be in the form of glass fiber cloth. Through secondary infusion and curing together, it is ensured that the carbon fiber is used in the form of pultrusion, thereby improving the performance of the main beam.

While some embodiments of the invention have been described in this document, those skilled in the art will appreciate that these embodiments are shown by way of example only. Numerous modifications, alternatives and improvements will occur to those skilled in the art under the teachings of this invention without departing from the scope of this invention. It is intended that the appended claims define the scope of the invention and that methods and structures within the scope of these claims themselves and their equivalents be covered thereby.

What is claimed is:

1. A main beam for wind turbine blade, comprising:
one or more carbon fiber pultruded bodies, each of the one or more carbon fiber pultruded bodies comprising one or more carbon fiber pultruded sheets, the one or more carbon fiber pultruded sheets are stacked along a thickness direction of the one or more carbon fiber pultruded bodies, wherein the one or more carbon fiber pultruded sheets are formed by curing a first infusion material;
one or more inlays, which are arranged adjacent to the one or more carbon fiber pultruded bodies in a direction perpendicular to a thickness direction of the main beam;
one or more overlays, which cover the one or more carbon fiber pultruded bodies and/or the one or more inlays on both sides in the thickness direction of the main beam; and
a second infusion material, which impregnates the one or more carbon fiber pultruded bodies, the one or more inlays and the one or more overlays,
wherein the one or more carbon fiber pultruded sheets comprise a plurality of carbon fiber pultruded sheets, and a glass fiber infusion material is provided between at least two of the plurality of carbon fiber pultruded sheets,
wherein the glass fiber infusion material and the second infusion material are the same material.

2. The main beam for wind turbine blade according to claim 1, wherein the one or more carbon fiber pultruded bodies have m of the one or more carbon fiber pultruded sheets, and the main beam has n of the one or more carbon fiber pultruded bodies, p of the one or more inlays, and q of the one or more overlays, wherein m, n, p, q are integers from 1 to 100.

3. The main beam for wind turbine blade according to claim 1, wherein the first infusion material comprises one or more of thermosetting epoxy resin, vinyl resin, unsaturated polyester resin, phenolic resin, and thermoplastic resin.

4. The main beam for wind turbine blade according to claim 3, wherein the thermoplastic resin comprises one or more of polypropylene resin, polyethylene resin, polyvinyl chloride resin, polystyrene resin, acrylonitrile-butadiene-styrene copolymer resin, polyamide resin, polyetheretherketone resin, and polyphenylene sulfide resin.

5. The main beam for wind turbine blade according to claim 1, wherein each of the one or more overlays comprises glass fiber fabric or glass fiber non-woven fabric.

6. The main beam for wind turbine blade according to claim 1, wherein each of the one or more inlays comprises one or more of the PVC foam, PET foam, PMI foam, wood, honeycomb sandwich material, glass fiber pultruded sheet, glass fiber fabric, glass fiber non-woven fabric, and glass fiber yarn,
  wherein the second infusion material comprises one or more of thermosetting epoxy resin, vinyl resin, unsaturated polyester resin, phenolic resin, thermoplastic resin,
  wherein the thermoplastic resin comprises one or more of polypropylene resin, polyethylene resin, polyvinyl chloride resin, polystyrene resin, acrylonitrile-butadiene-styrene copolymer resin, polyamide resin, polyetheretherketone resin, polyphenylene sulfide resin.

7. The main beam for wind turbine blade according to claim 1, wherein the one or more inlays comprise:
  a main body, the thickness d1 of which is less than or equal to the sum D of the thicknesses of the adjacent one or more carbon fiber pultruded bodies and the one or more overlays; and
  a transition portion, the thickness d2 of which varies between zero and D−d1, wherein the transition portion is arranged between the main body and the adjacent one or more carbon fiber pultruded bodies to form a thickness transition.

8. The main beam for wind turbine blade according to claim 7, wherein the cross-section of the main body is rectangular and the cross-section of the transition portion is triangular.

9. A wind turbine, comprising the main beam for wind turbine blade according to one of claim 1.

10. A method for manufacturing the main beam for wind turbine blade, comprising the following steps:
  providing one or more carbon fiber pultruded bodies, each of the one or more carbon fiber pultruded bodies comprising one or more carbon fiber pultruded sheets, the one or more carbon fiber pultruded sheets are stacked along a thickness direction of the one or more carbon fiber pultruded bodies, wherein the one or more carbon fiber pultruded sheets are formed by curing a first infusion material, wherein the one or more carbon fiber pultruded sheets comprise a plurality of carbon fiber pultruded sheets, and a glass fiber infusion material is arranged between every two of the plurality of carbon fiber pultruded sheets;
  arranging one or more inlays adjacent to the one or more carbon fiber pultruded bodies in a direction perpendicular to a thickness direction of the main beam;
  arranging one or more overlays on the one or more carbon fiber pultruded bodies and/or the one or more inlays on both sides in the thickness direction of the main beam; and
  impregnating the one or more carbon fiber pultruded bodies, the one or more inlays and the one or more overlays with a second infusion material.

11. The method for manufacturing the main beam for wind turbine blade according to claim 10, wherein arranging the one or more inlays adjacent to the one or more carbon fiber pultruded bodies in the direction perpendicular to the thickness direction of the main beam comprises the following steps:
  disposing a main body of the one or more inlays adjacent to the one or more fiber pultruded bodies, wherein the thickness d1 of the main body of the one or more inlays is less than the sum D of the thicknesses of the adjacent one or more carbon fiber pultruded bodies and the one or more overlays; and
  arranging a transition portion of the one or more inlays between the main body of the one or more inlays and the adjacent one or more carbon fiber pultruded bodies to form a thickness transition, wherein the thickness d2 of the transition portion of the one or more inlays varies between zero and D−d1.

12. The method for manufacturing the main beam for wind turbine blade according to claim 10, wherein arranging the one or more inlays adjacent to the one or more carbon fiber pultruded bodies in the direction perpendicular to the thickness direction of the main beam comprises the following steps:
  placing the one or more inlays on both sides of each of the one or more carbon fiber pultruded bodies to form a continuous composite.

13. The method for manufacturing the main beam for wind turbine blade according to claim 10, wherein providing the one or more carbon fiber pultruded bodies comprises the following steps:
  arranging the one or more carbon fiber pultruded sheets stacked with each other along the thickness direction of the one or more carbon fiber pultruded bodies, wherein the one or more carbon fiber pultruded sheets have been impregnated and cured with the first infusion material; and
  setting a glass fiber infusion layer between every two of the plurality of carbon fiber pultruded sheets for secondary infusion.

\* \* \* \* \*